United States Patent
So et al.

(10) Patent No.: US 10,404,617 B2
(45) Date of Patent: Sep. 3, 2019

(54) METHOD AND APPARATUS FOR RESOURCE ALLOCATION IN COMMUNICATION SYSTEM

(71) Applicant: Samsung Electronics Co., Ltd., Suwon-si, Gyeonggi-do (KR)

(72) Inventors: Young-Wan So, Gunpo-si (KR); Kyung-Mo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 15/127,971

(22) PCT Filed: Mar. 30, 2015

(86) PCT No.: PCT/KR2015/003103
§ 371 (c)(1),
(2) Date: Sep. 21, 2016

(87) PCT Pub. No.: WO2015/147609
PCT Pub. Date: Oct. 1, 2015

(65) Prior Publication Data
US 2017/0099233 A1    Apr. 6, 2017

(30) Foreign Application Priority Data

Mar. 28, 2014 (KR) .......... 10-2014-0037083

(51) Int. Cl.
*H04L 12/911* (2013.01)
*H04L 29/06* (2006.01)
(Continued)

(52) U.S. Cl.
CPC .......... *H04L 47/82* (2013.01); *H04L 12/6418* (2013.01); *H04L 47/78* (2013.01);
(Continued)

(58) Field of Classification Search
CPC ........ H04H 60/25; H04H 60/72; H04H 60/85; H04L 12/4608; H04L 47/10;
(Continued)

(56) References Cited

U.S. PATENT DOCUMENTS

2005/0190771 A1 * 9/2005 Tan .................. H04L 47/10
370/395.21
2007/0207727 A1 * 9/2007 Song .................. H04H 20/93
455/3.06
(Continued)

FOREIGN PATENT DOCUMENTS

EP       2247044 A1 * 11/2010 ............. H04L 47/10
JP    2000-151652 A      5/2000
(Continued)

OTHER PUBLICATIONS

Japanese Office Action dated Nov. 6, 2018, issued in a counterpart Japanese application No. 2016-559218.

(Continued)

*Primary Examiner* — Wing F Chan
*Assistant Examiner* — Rajeshwari Krishnan
(74) *Attorney, Agent, or Firm* — Jefferson IP Law, LLP

(57) ABSTRACT

The present invention relates to a method and an apparatus for allocating resources in a communication system using an asset delivery characteristics (ADC) message so as to improve efficiency in network resource usage. A method for allocating network resources in a transmission unit of a communication system according to the present invention comprises the steps of: generating an ADC message that includes a parameter value representing a transmission characteristic of a single asset; and transmitting the generated ADC message, wherein the generated ADC message is updated periodically or aperiodically with respect to the asset.

15 Claims, 14 Drawing Sheets

(51) Int. Cl.
  *H04L 12/64* (2006.01)
  *H04W 28/26* (2009.01)
  *H04N 21/2385* (2011.01)
(52) U.S. Cl.
  CPC ......... *H04L 65/80* (2013.01); *H04N 21/2385* (2013.01); *H04W 28/26* (2013.01)
(58) Field of Classification Search
  CPC ....... H04L 5/003–006; H04L 47/78–82; H04L 65/80; H04N 21/84–8451; H04N 21/234–2385; H04W 36/00–28
  See application file for complete search history.

(56) References Cited

U.S. PATENT DOCUMENTS

| | | | |
|---|---|---|---|
| 2012/0016993 A1 | 1/2012 | Kisel et al. | |
| 2012/0039264 A1 | 2/2012 | Kim et al. | |
| 2012/0324521 A1* | 12/2012 | Rhyu | H04N 21/84 725/109 |
| 2013/0094563 A1 | 4/2013 | Bae | |
| 2014/0023071 A1 | 1/2014 | Park et al. | |
| 2014/0105132 A1* | 4/2014 | Park | H04L 5/006 370/329 |
| 2015/0043429 A1 | 2/2015 | Kim et al. | |
| 2015/0089560 A1 | 3/2015 | Park et al. | |
| 2015/0092688 A1 | 4/2015 | Jeong et al. | |
| 2015/0124818 A1* | 5/2015 | Bae | H04N 21/234327 370/392 |

FOREIGN PATENT DOCUMENTS

| | | |
|---|---|---|
| JP | 2012-514880 A | 6/2012 |
| KR | 10-2013-0120422 A | 11/2013 |
| KR | 10-2014-0008237 A | 1/2014 |
| WO | 2009/136710 A1 | 11/2009 |
| WO | 2013/055168 A1 | 4/2013 |
| WO | 2013/122374 A1 | 8/2013 |
| WO | 2013/133676 A1 | 9/2013 |

OTHER PUBLICATIONS

MPEG-H Systems, Kyungmo Park et al., Study of ISO/IEC CD 23008-1 MPEG media transport, Jul. 20, 2012, Shanghai, China.

* cited by examiner

US 10,404,617 B2

METHOD AND APPARATUS FOR RESOURCE ALLOCATION IN COMMUNICATION SYSTEM

CROSS-REFERENCE TO RELATED APPLICATION(S)

This application is a U.S. National Stage application under 35 U.S.C. § 371 of an International application filed on Mar. 30, 2015 and assigned application number PCT/KR2015/003103, which claimed the benefit of a Korean patent application filed on Mar. 28, 2014 in the Korean Intellectual Property Office and assigned Serial number 10-2014-0037083, the entire disclosure of which is hereby incorporated by reference.

DETAILED DESCRIPTION OF THE INVENTION

Technical Field

The present invention relates to methods and apparatuses for allocating resources to enhance use efficiency of network resources using asset delivery characteristics (ADC) messages in communication systems.

Background Art

Recent multimedia services consider hybrid networks providing connection with both broadcast networks and communication networks and MPEG media transport (MMT) technology for offering multimedia data including multimedia transmitted, applications, webpages, and other files.

Multimedia service refers to streaming services, such as interactive services, e.g. video call, or video on demand (VOD) services, and multicast and broadcast services. Meanwhile, real-time multimedia services may be classified into interactive services and streaming services according to service types. Further, real-time multimedia services may be divided into unicast, multicast, and broadcast services depending on the number of users attending, which have different transmission requirements.

MMT technology concerns moving picture experts group (MPEG)-based multimedia transmission technology, and this technology may be used instead of MPEG-2 transport stream (TS) for multi-functional smart television (TV), multi-view TV, or N-screen broadcast and multimedia services and may offer an efficient MPEG transmission technique in multimedia service environments that vary based on internet protocol (IP).

Meanwhile, communication system providing multimedia services has used a separate legacy protocol (e.g., RSVP) in the course of allocating resources for particular traffic, and in the separate legacy protocol, a constant, unchanged representative value (e.g., peak rate, t in FIG. 1) is used to reserve resources. However, actual media traffic (e.g., a bit rate over time in a particular movie) varies over time, and in such case, intermediate nodes (e.g., routers) in the network cannot identify variations in transmission characteristics of component media traffic constituting the traffic nor can they identify information on the media passing through the inside of resource-reserved traffic.

Further, the amount of resources allocated (i.e., reserved) to a particular traffic by intermediate nodes in the network is arbitrarily determined by the media sending entity or receiving entity without considering the network intermediate nodes. In such case, resources (i.e., bandwidth) are reserved based on a representative value, and at this time, the network intermediate nodes may cause unnecessary resource waste.

To address this issue, resource waste may be reduced by periodically performing reserved update, but such approach may cause an increase in overhead upon end-to-end resource reservation update.

DISCLOSURE

Technical Solution

According to the present invention, there are provided a resource allocation method and apparatus that may enhance use efficiency of network resources using asset delivery characteristics (ADC) messages in a communication system.

Further, according to the present invention, there are provided a resource allocation method and apparatus allowing for intermediate nodes in a network, which receive media traffic variation characteristics to operate in a manner enabling efficient resource operation when a communication system performs a media transmission service.

Further, according to the present invention, there are provided a resource allocation method and apparatus enabling efficient use of limited network resources and reducing resource reservation update in a communication system.

Means to Solve Problems

According to the present invention, a method for allocating a network resource in a sending entity in a communication system comprises generating an asset delivery characteristics (ADC) message including a parameter value indicating a transmission characteristic on one asset and sending the generated ADC message, wherein the generated ADC message is periodically or aperiodically updated for the asset.

Further, according to an embodiment of the present invention, a method for allocating a network resource in an intermediate node of a communication system comprises receiving an asset delivery characteristics (ADC) message including a parameter value indicating a transmission characteristic on one asset, in a case where the ADC message is different from an ADC message previously received, identifying the amount of network resources required in the ADC message based on the ADC message, comparing the amount of network resources previously reserved with the identified amount of network resources to estimate the amount of available network resources, and allocating the estimated amount of available network resources to other traffic, wherein the ADC message is periodically or aperiodically updated for the asset.

Further, according to an embodiment of the present invention, a method for allocating a network resource in a receiving entity in a communication system comprises receiving an asset delivery characteristics (ADC) message including a parameter value indicating a transmission characteristic on one asset and estimating the amount of buffer for the asset based on the received, at least, one ADC message, wherein the ADC message is periodically or aperiodically updated for the asset.

Further, according to an embodiment of the present invention, an apparatus for allocating a network resource in a sending entity in a communication system comprises a controller generating an asset delivery characteristics (ADC) message including a parameter value indicating a transmission characteristic on one asset and a sending unit sending the generated ADC message, wherein the generated ADC message is periodically or aperiodically updated for the asset.

Further, according to an embodiment of the present invention, an apparatus for allocating a network resource in an intermediate node of a communication system comprises a receiving unit receiving an asset delivery characteristics (ADC) message including a parameter value indicating a transmission characteristic on one asset and a controller, in a case where the ADC message is different from an ADC message previously received, identifying the amount of network resources required in the ADC message based on the ADC message, comparing the amount of network resources previously reserved with the identified amount of network resources to estimate the amount of available network resources, and allocating the estimated amount of available network resources to other traffic, wherein the ADC message is periodically or aperiodically received for the asset.

Further, according to an embodiment of the present invention, an apparatus for allocating a network resource in a receiving entity in a communication system comprises a receiving unit receiving at least one asset delivery characteristics (ADC) message including a parameter value indicating a transmission characteristic on one asset and a controller estimating the amount of buffer for the asset based on the received, at least, one ADC message, wherein the ADC message is periodically or aperiodically received for the asset.

BEST MODE

Hereinafter, preferred embodiments of the present invention are described in detail with reference to the accompanying drawings. It should be noted that the following description primarily focuses on what is necessary for understanding the operations of the embodiments, omitting descriptions unnecessary for clarifying the subject matter of the present invention.

A major gist of the present invention is to allocate resources using an asset delivery characteristics (ADC) message to enhance use efficiency of network resources. In particular, according to an embodiment of the present invention, the sending entity sends ADC message to the receiving entity and intermediate nodes in intermediate ends of the network, and the receiving entity refers to the received ADC message to adjust the amount of buffer per media (asset) in the receiving entity according to time. Media aware network entities (MANEs) which are intermediate nodes over the network allocate a predetermined amount of network resources to a corresponding flow through a network resource reservation protocol to provide a per-flow service to the receiving entity. Further, they extract the ADC message from MMT packets transmitted from the sending entity to the receiving entity, extract a value indicating the current transmission characteristic of assets flowing through a particular MMT flow from the corresponding ADC message, compare the amount of resources reserved as a representative value through the network resource reservation protocol with the amount of actually necessary resources per media as identified through the ADC message, identify the amount of resources available, and allocate them to other traffic. Such embodiment of the present invention allows the communication system to efficiently utilize network resources.

To that end, according to an embodiment of the present invention, a method and apparatus for allocating resources in a communication system are described in detail.

Figure 1:
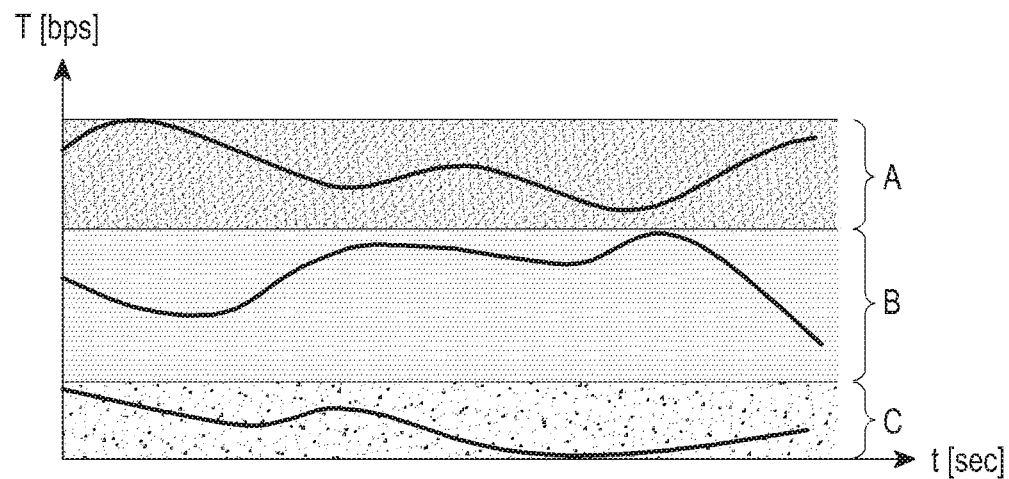
FIGS. 1 and 2 are views illustrating use of network resources in a conventional communication system.
Figure 2:
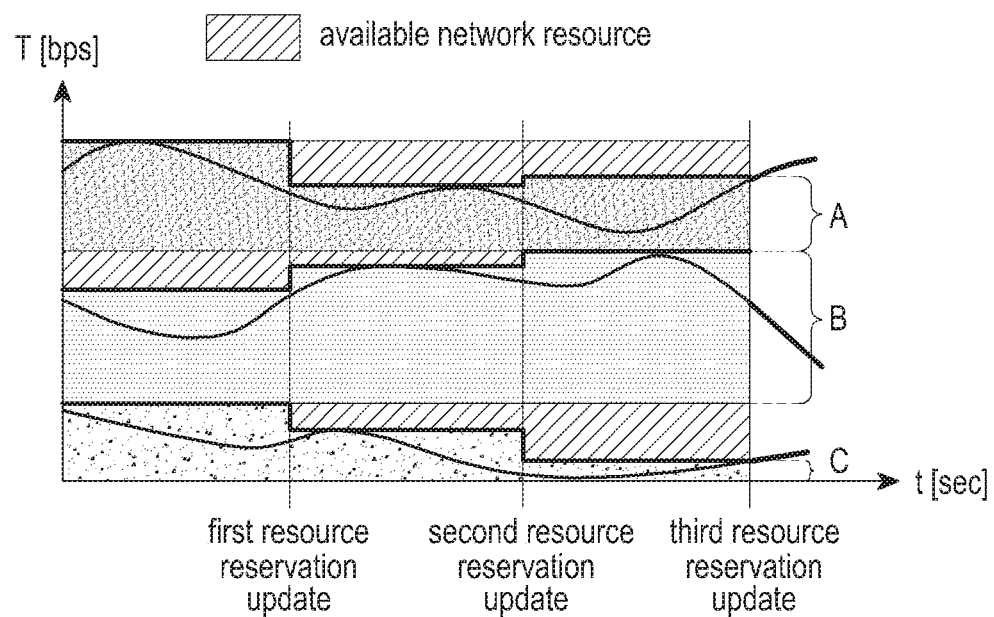
Figure 3:
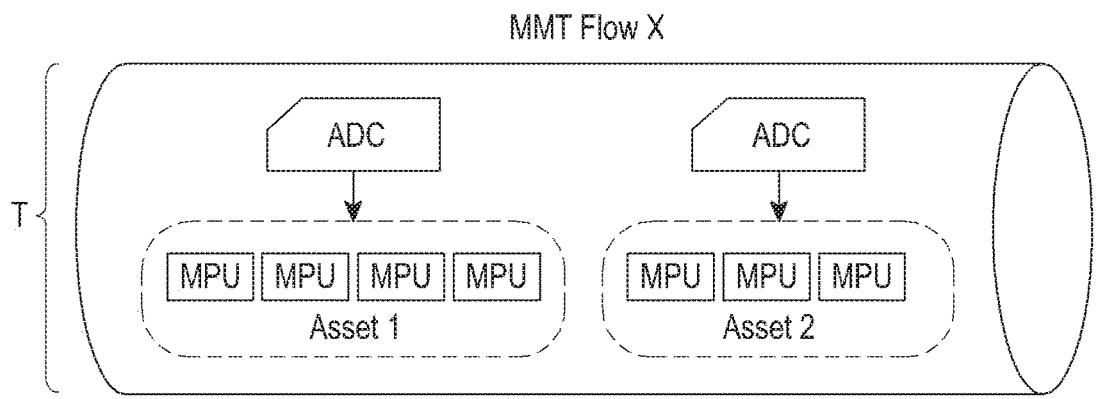
FIG. 3 is a view illustrating a MMT flow configuration applicable to a communication system according to an embodiment of the present invention.

FIG. 3 is a view illustrating a MMT flow configuration applicable to a communication system according to an embodiment of the present invention.

Referring to FIG. 3, an ADC message in a MMT flow includes information (hereinafter, ADC signaling information) indicating the transmission characteristic of asset (e.g., video, audio, text, or file). An ADC message for one asset includes a plurality of media processing units (MPUs).

The format of ADC message defined in MPEC MMT Amd1. is constituted as shown in Table 1 below.

TABLE 1

| Syntax | Value | No. of bits | Mnemonic |
|---|---|---|---|
| ADC_message ( ) { | | | |
|     message_id | | 16 | uimsbf |
|     version | | 8 | uimsbf |
|     length | | 32 | uimsbf |
|     message_payload { | | | |
|         ADC_level_fag | | 1 | boolean |
|         if (ADC_level_flag == 1){ | | | |
|             MPU_sequence_number | | 32 | uimsbf |
|         } | | | |
|         packet_id | | 16 | uimsbf |
|         qos_descriptor{ | | | |
|             loss_tolerance | | 8 | uimsbf |
|             jitter_sensitivity | | 8 | uimsbf |
|             class_of_service | | 1 | bslbf |
|             bidirection_indicator | | 1 | bslbf |
|         } | | | |
|         if (class_of_service == 1) | | | |
|         bitstream_descriptor_vbr{ | | | |
|             flow_label | | 7 | uimsbf |
|             sustainable_rate | | 16 | uimsbf |
|             buffer_size | | 16 | uimsbf |
|             peak_rate | | 16 | uimsbf |
|             max_MFU_size | | 8 | uimsbf |
|             mfu_period | | 8 | uimsbf |
|         }else | | | |
|         bitstream_descriptor_cbr{ | | | |
|             flow_label | | 7 | uimsbf |
|             peak_rate | | 16 | uimsbf |
|             max_MFU_size | | 8 | uimsbf |
|             mfu_period | | 8 | uimsbf |
|         } | | | |
|     } | | | |
| } | | | |

In Table 1, syntax is defined as in the following Table 2.

TABLE 2

| Syntax | Definition |
|---|---|
| message_id | indicates the identifier of the ADC messages. |
| version | indicates the version of the ADC messages. |
| length | a 32-bit field for conveying the length of the ADC message in bytes, counting from the beginning of the next field to the last byte of the ADC message. The value '0' is not valid for this field. |
| loss_tolerance | indicates required loss tolerance of the Asset for the delivery. The value of loss_tolerance attribute is listed in Table AMD1.1. |
| jitter_sensitivity | indicates required jitter level of underlying delivery network for the Asset delivery between end-to-end. The value of jitter_sensitivity attribute is listed in Table AMD1.2. |
| class_of_service | classifies the services in different classes and manage each type of bitstream with a particular way. For example, MANE can manage each type of bitstream with a particular way. This field indicates the type of bitstream attribute as listed in Table AMD1.3. |
| Bidirection_indicator | If set to '1', bidirectional delivery is required. If set to '0', bidirectional delivery is not required. |
| Bitstream_descriptorVBRType | when class_of_service is '1', "Bitstream_descriptorVBRType" shall be used for "Bitstream_descriptorType". |
| Bitstream_descriptorCBRType | when class_of_service is '0', "Bitstream_descriptorVBRType" shall be used for "Bitstream_descriptorType". |
| sustainable_rate | defines the minimum bitrate that shall be guaranteed for continuous delivery of the Asset. The sustainable_rate corresponds to drain rate in token bucket model. The sustainable_rate is expressed in bytes per second. |
| buffer_size | defines the maximum buffer size for delivery of the Asset. The buffer absorbs excess instantaneous bitrate higher than the sustainable_rate and the buffer_size shall be large enough to avoid overflow. The buffer_size corresponds to bucket depth in token bucket_model. Buffer_size of a CBR (constant bit rate) Asset shall be zero. The buffer_size is expressed in bytes |
| peak_rate | defines peak bitrate during continuous delivery of the Asset. The peak_rate is the highest bitrate during every MFU_period. The peak_rate is expressed in bytes per second. |
| MFU_period | defines period of MFUs during continuous delivery of the Asset. The MFU_period measured as the time interval of sending time between the first byte of two consecutive MFUs. The MFU_period is expressed in millisecond. |
| max_MFU_size | indicates the maximum size of MFU, which is MFU_period*peak_rate. The max_MFU_size is expressed in byte. |
| flow_label (7bits) | indicates the flow identifier. The application can perform per-flow QoS operations in which network resources are temporarily reserved during the session. A flow is defined to be a bitstream or a group of bitstreams whose network resources are reserved according to transport characteristics or ADC in Package. It is an implicit serial number from '0' to '127'. An arbitrary number is assigned temporarily during a session and refers to every individual flow for whom a decoder (processor) is assigned and network resource could be reserved. |
| packet_id (16 bits) | this field is an integer value that can be used to distinguish one Asset from another. The value of this field is derived from the asset_id of the Asset where this packet belongs to. The mapping |

TABLE 2-continued

| Syntax | Definition |
| --- | --- |
| | between the packet_id and the asset_id is signaled by the MMT Package Table as part of a signalling message (see sub-clause 9.3.4). Separate value will be assigned to signalling messages and FEC repair flows. The packet_id is unique throughout the lifetime of the delivery session and for all MMT flows delivered by the same MMT sending entity. For AL-FEC, the mapping between packet_id and the FEC repair flow is provided in the AL-FEC message (see Annex C.6). |
| ADC_level_flag (1 bit) | indicates whether included ADC information is for an Asset or for a MPU. If set to '0'. ADC signaling message includes information for an Asset. If set to '1', it includes ADC information for single MPU. |

Figure 4A:
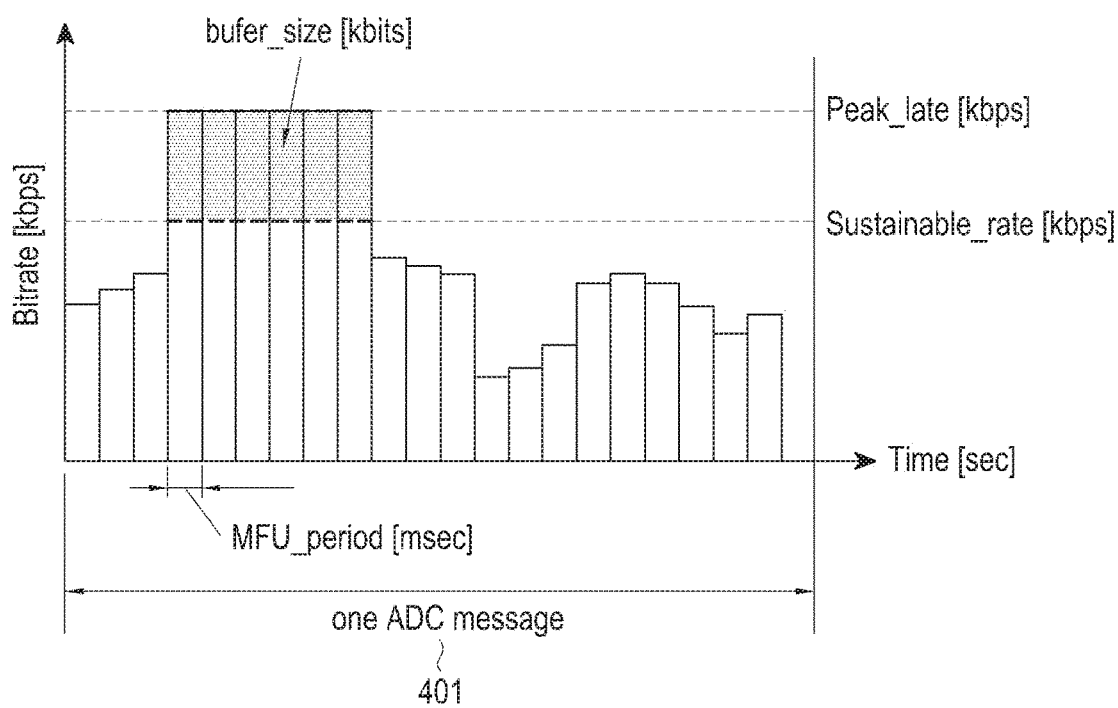
FIGS. 4A and 4B are views illustrating an example in which a sending entity transmits one ADC message per asset according to an embodiment of the present invention.
Figure 4B:
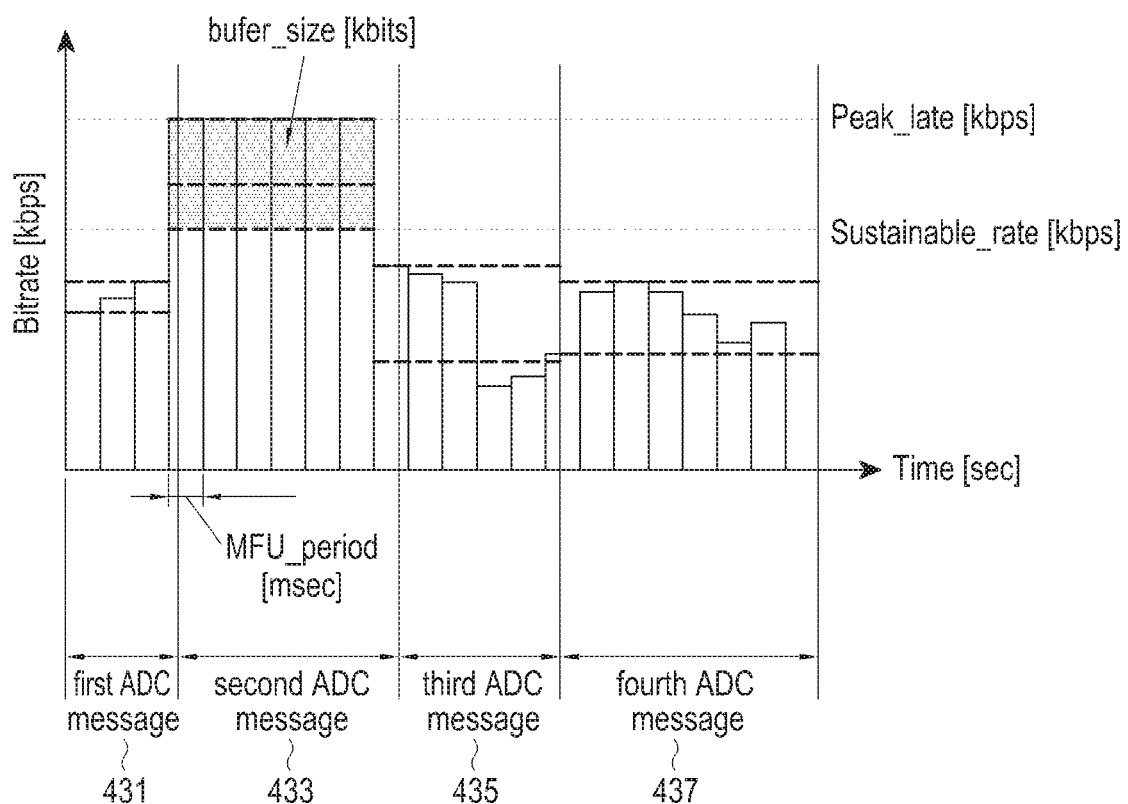

FIGS. 4A and 4B are views illustrating an example in which a sending entity transmits one ADC message per asset according to an embodiment of the present invention (One ADC per One Asset). Here, FIG. 4A shows an example in which the sending entity does not update ADC message, and FIG. 4B shows an example in which the sending entity continues to update ADC message.

As shown in FIG. 4A, as per the MPEG MMT standard, only one ADC message 401 may be mapped to one asset, and various delivery-related information (i.e., ADC signaling information) in the ADC message 401 represents the transmission characteristic of the asset. The ADC signaling information includes a parameter value indicating the transmission characteristic, and the parameter value includes at least one of a sustainable transmission rate (sustainable_rate), a buffer size (buffer_size), a maximum transmission rate (peak_rate), a maximum MFU (Media Fragment Unit) size (max_MFU_size), and one MFU period (MFU_period). max_MFU_size is computed from multiplication of peak_rate and MFU_period.

At this time, in case the receiving entity receives one ADC message for one asset, it uses only fixed representative value included in one ADC message, and thus, it may be difficult to efficiently reflect the transmission characteristic of asset temporally varying.

To that end, the sending entity sending media as shown in FIG. 4B updates ADC signaling information corresponding to the transmission characteristic of current asset at predetermined intervals for one asset and sends the same to an intermediate node. If four intervals are previously determined as in the example shown in FIG. 4B, the sending entity updates ADC signaling information each interval and sends first to fourth ADC messages 431 to 435 to the intermediate node. At this time, the sending entity, after tagging version information indicating that ADC signaling information has been varied in each of the first to fourth ADC messages 431 to 435, sends the first to fourth ADC messages 431 to 435, efficient transmission may be possible without departing from the current standard.

At this time, in order for the intermediate node to recognize a parameter value more accurately indicating the media transmission characteristic, it identifies the version information of ADC message, and in case the version of ADC message is varied for a particular asset, it identifies that the transmission characteristic of the corresponding asset has been varied and may perform the operation of updating the current use status information on network resources.

Figure 5A:
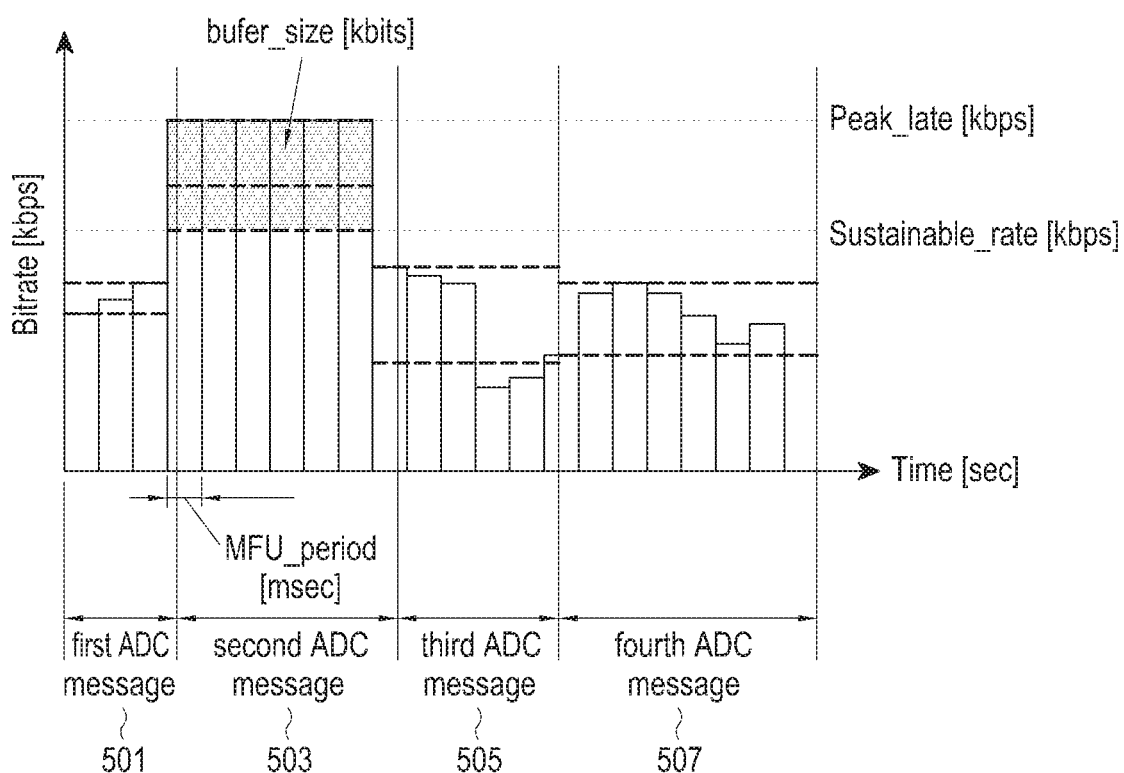
FIGS. 5A and 5B are views illustrating a method for updating an ADC message in a sending entity according to an embodiment of the present invention.
Figure 5B:
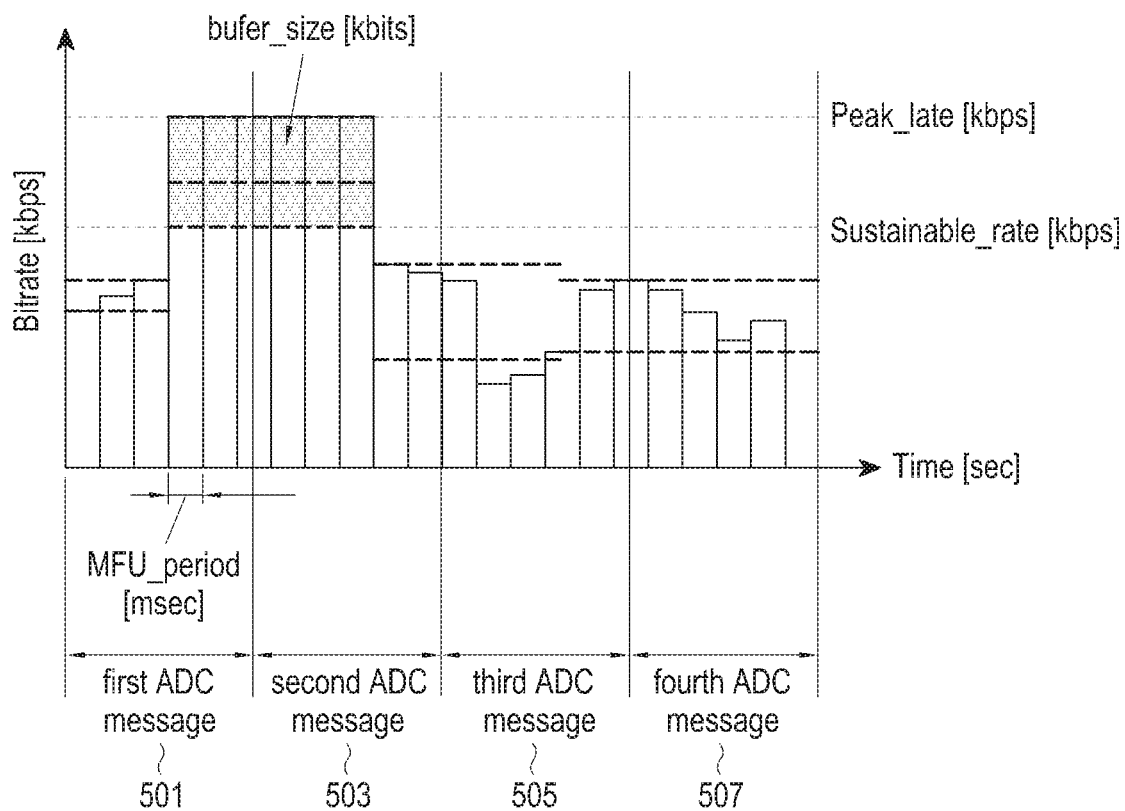

FIGS. 5A and 5B are views illustrating a method for updating an ADC message in a transmission unit according to an embodiment of the present invention. Here, FIG. 5A shows an example in which the sending entity variably updates ADC message, and FIG. 5B shows an example in which the sending entity updates ADC message at predetermined fixed periods.

Referring to FIGS. 5A and 5B, ADC message may be updated in variable time units or fixed time units.

As shown in FIG. 5A, in case of updating ADC message in variable time units, the sending entity updates ADC message in a way of cutting off at each meaningful moment when the network characteristic is drastically varied and transfers a first to fourth ADC message 501 to 507, thus allowing for provision of ADC message containing more accurate ADC signaling information to the intermediate node. However, since the time when the ADC signaling information remains valid is inconstant, and extra resource computation should be conducted considering even ADC signaling information of other assets having no constant valid time, the complexity is increased. Further, creation of meaningful ADC signaling information may sometimes render the valid period of ADC message to be too short, and in such case, resources might not be allocated to other flow.

As shown in FIG. 5B, in case of updating ADC message in fixed even interval time units, the sending entity faces a significant difficulty in updating ADC message in a way of cutting off at each meaningful moment, such as when the network characteristic is drastically varied, and transferring a first to fourth ADC message 531 to 537, thus rendering it difficult to provide ADC message containing more accurate ADC signaling information to the intermediate node. However, since the time when the ADC signaling information remains valid is a fixed constant value, and extra resource computation should be conducted considering even ADC signaling information of other assets having inconstant situations, the complexity is increased. Further, creating meaningful ADC signaling information may result in the valid period of ADC message being too short, and in such case, resources might not be allocated to other flow.

Figure 6:
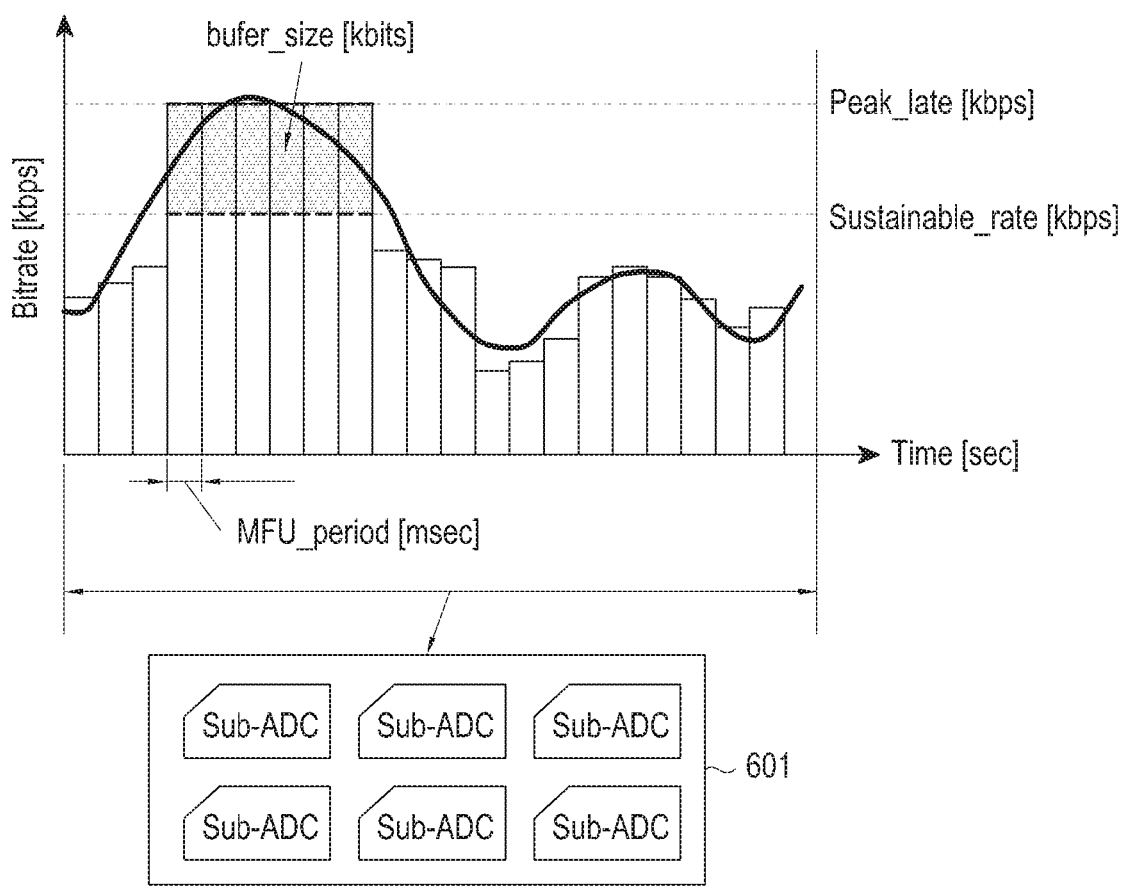
FIG. 6 is a view illustrating an example in which a sending entity transmits an ADC message in a sub-ADC form according to an embodiment of the present invention.

FIG. 6 illustrates an example in which a sending entity sends one ADC message in a sub-ADC form (Sub-ADC per One Asset) according to an embodiment of the present invention.

Referring to FIG. 6, although not presently defined in the PEG MMT standard, the sending entity may send an ADC message 601 specifying the overall transmission characteristic of a particular asset through the concept of sub-ADC. Such ADC message 601 specifies the characteristic of the overall corresponding asset and thus may previously inform a MANE router or receiving entity of information on the form in which the traffic of corresponding media is to be received in the future, which enables future traffic to be predicted.

Now described are a sending entity sending MMT packets, a receiving entity receiving MMT packets, and an intermediate node transferring packets between the sending entity and the receiving entity and allocating network resources for packet delivery in a communication system according to an embodiment of the present invention.

Figure 7:
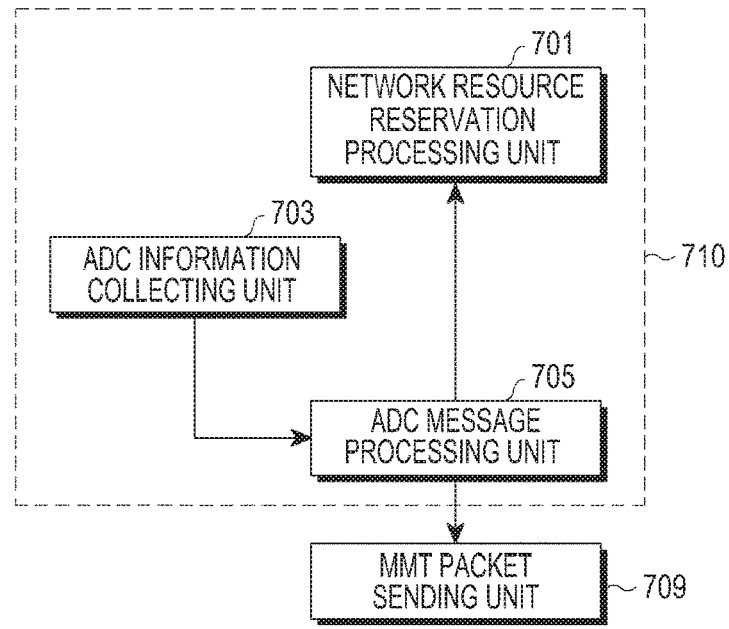
FIG. 7 is a view illustrating a configuration of a sending entity in a communication system according to an embodiment of the present invention.

FIG. 7 is a view illustrating a configuration of a transmission unit in a communication system according to an embodiment of the present invention.

Referring to FIG. 7, the sending entity includes a network resource reservation processing unit 701, an ADC information collecting unit 703, an ADC message processing unit 705, and a MMT packet sending unit 707. Here, the network resource reservation processing unit 701, the ADC information collecting unit 703, and the ADC message processing unit 705 may be included in one control unit 710.

The ADC information collecting unit 703 collects ADC signaling information including a parameter value indicating the transmission characteristic of media (asset) defined per asset. The network resource reservation processing unit 701 reserves a network resource for MMT traffic transmission with a separate protocol not defined in MMT. The MMT packet sending unit 707 packetizes an ADC message including at least one of an asset, ADC signaling information, version information on the ADC message, and valid period of the ADC message and sends to the receiving entity.

In particular, according to an embodiment of the present invention, the ADC message processing unit 705 modifies and processes the collected ADC signaling information along with the MANE before sending the same to the receiving entity. That is, the ADC message processing unit 705, in case only one ADC message is allowed per asset, extracts the transmission characteristic value according to MPU unit which is the unit of configuration of asset or the transmission characteristic according to time of the asset in such a manner as to analyze asset one by one or through the collected ADC signaling information and identifies a value indicating the transmission characteristic of MPU being currently transmitted or current time per predetermined unit (e.g., particular MPU unit, predetermined fixed time unit (a), or variable time unit (a) highly representative). The ADC message processing unit 705 configures an ADC message including a value indicating the transmission characteristic (i.e., ADC signaling information), version information on the ADC message, and valid period of the ADC message.

The ADC message processing unit 705, in case sub-ADC is allowed, includes a list of values indicating the transmission characteristic mapped as per MPU unit or time of particular asset in the ADC message and sends the same simultaneously. Specifically, the ADC message processing unit 705 generates sub-ADC information specifying component asset transmission characteristic per even time interval, tags the time period information specified by the sub-ADC information per sub-ADC information, and configures the list in one full ADC message. In another embodiment, the ADC message processing unit 705, if necessary for increasing the meaningfulness of information, generates sub-ADC information specifying component asset transmission characteristic per meaningful uneven time interval (aperiodic), tags the time period information specified by the sub-ADC information per sub-ADC information, and configures the list in one full ADC message. In another embodiment, the ADC message processing unit 705 generates sub-ADC information specifying the transmission characteristic per even MPU or MFU interval, tags on every sub-ADC information as to whether the sub-ADC information is information on what number of MPU or what number of MFU, and configures the list in one full ADC message.

Figure 8:
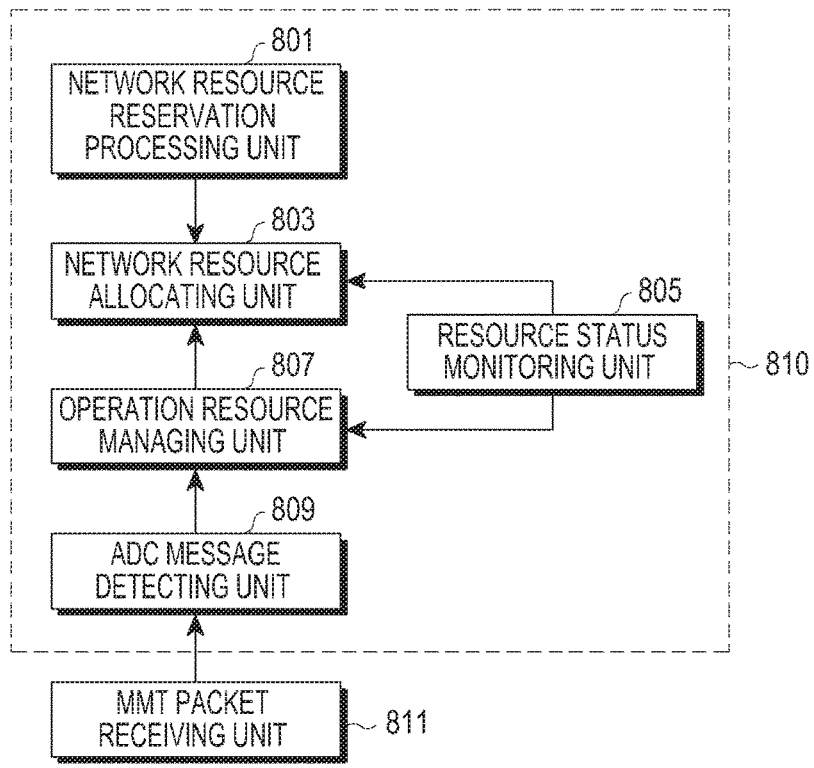
FIG. 8 is a view illustrating a configuration of an intermediate node in a communication system according to an embodiment of the present invention.

FIG. 8 illustrates a configuration of an intermediate node in a communication system according to an embodiment of the present invention Referring to FIG. 8, the intermediate node includes a network resource reservation processing unit 801, a network resource allocating unit 803, a resource status monitoring unit 805, an operation resource managing unit 807, an ADC message detecting unit 809, and a MMT packet receiving unit 811. Here, the network resource reservation processing unit 801, the network resource allocating unit 803, the resource status monitoring unit 805, the operation resource managing unit 807, and the ADC message detecting unit 809 may be configured in one control unit 810.

The MMT packet receiving unit 811 receives a MMT packet from the sending entity.

According to an embodiment of the present invention, the ADC message detecting unit 809 detects an ADC message containing ADC signaling information from received MMT packets. As an example, the ADC message detecting unit 809 determines whether the message is an ADC message through the type field of the header of MMT packet and determines whether the message contains ADC signaling information based on the message_id information in the ADC message.

The ADC message detecting unit 809, in case as a result of identifying the received MMT packets only one ADC message is contained in each asset, determines whether the ADC message is an ADC message newly updated to reflect current traffic circumstance through the version information in the received ADC message, and in case it is the newly updated ADC message, updates the value indicating the transmission characteristic of the asset based on the new ADC signaling information. The ADC message detecting unit 809 computes the total amount T' of resources actually required per asset and computes the amount |T−T'| of extra resources that have been allocated to the MMT flow but not actually used, and in case the amount of extra resources exceeds a predetermined level (threshold), determines that allocation to other traffic does not overburden and includes as a target resource allocation candidate for other flow. Thereafter, the ADC message detecting unit 809 determines how long the ADC signaling information of a particular version remains valid using, e.g., MPU sequence number specified by ADC message or valid period information in the ADC message, and in case it is determined that use of extra resources for other purposes during the valid period does not cause a significant problem and is meaningful enough, transfers the amount of extra resources to the operation resource managing unit 807 to be utilized for other flow.

By contrast, the ADC message detecting unit 809, in case as a result of identifying the received MMT packets sub-ADC is allowed per asset, derives an actual amount of resources required according to MPU/MFU or per time period through time period information or MPU/MFU mapping information. The ADC message detecting unit 809 computes the actual total sum amount T□ according to MPU/MFU or per time period by summating the actual resource amount required per asset mapped from the ADC messages. The ADC message detecting unit 809 derives, as per MPU/MFU or per time period, idle resources (T−T□) from among as many resources as T assigned to the current MMT flow and then transfers the amount of extra resources to the operation resource managing unit 807 to be utilized for other flow.

The resource status monitoring unit 805 monitors the network resource use status of the intermediate node and transfers to the network resource allocating unit 803 and the operation resource managing unit 807.

The operation resource managing unit 807 receives the use status of network resources of the intermediate node (e.g., a router) from the resource status monitoring unit 805 and analyzes the characteristic of media traffic passing through the intermediate node based on the received use status of network resources to identify available net resources. The network resource allocating unit 803 allocates the available network resources of the intermediate node to other traffic.

The network resource reservation processing unit 801 reserves a network resource for MMT traffic transmission with a separate protocol not defined in MMT.

Figure 9:
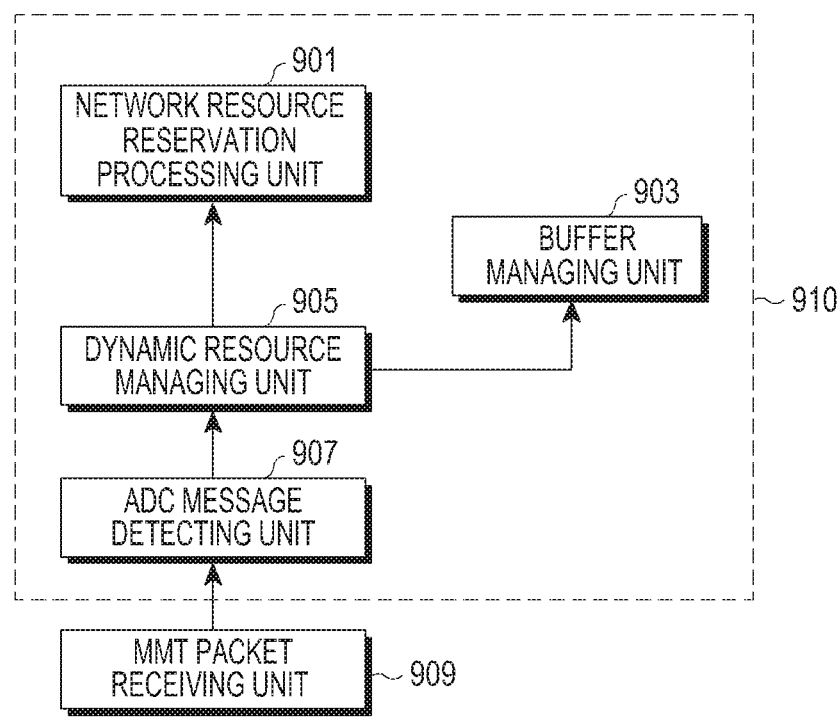
FIG. 9 is a view illustrating a configuration of a receiving entity in a communication system according to an embodiment of the present invention.

FIG. 9 is a view illustrating a configuration of a receiving entity in a communication system according to an embodiment of the present invention.

Referring to FIG. 9, the receiving entity includes a network resource reservation processing unit 901, a buffer managing unit 903, a dynamic resource managing unit 905, an ADC message detecting unit 907, and a MMT packet receiving unit 909. Here, the network resource reservation processing unit 901, the buffer managing unit 903, the dynamic resource managing unit 905, and the ADC message detecting unit 907 may be configured in one control unit 910.

The MMT packet receiving unit 909 receives MMT packets from the intermediate node. The ADC message detecting unit 907 detects an ADC message containing ADC signaling information from received MMT packets. At this time, the operation of the ADC message detecting unit 907 detects ADC message in a similar manner as that by the ADC message detecting unit 809 of the intermediate node, and no detailed description thereof is given.

The dynamic resource managing unit 905 receives ADC signaling information from the ADC message detecting unit 907 and efficiently updates network resource request considering the transmission characteristic as per the received ADC signaling information. The dynamic resource managing unit 905 determines the amount of buffer to be secured by the receiving entity per asset unit in the MMT flow, not the overall MMT flow, through the ADC signaling information and transfers information on the determined amount of buffer to the network resource reservation processing unit 901 and the buffer managing unit 903.

The network resource reservation processing unit 901 reserves and processes a network resource for MMT traffic transmission with a separate protocol not defined in MMT.

The buffer managing unit 903 secures the amount of buffer based on the information on the amount of buffer necessary per asset unit in the MMT flow as received from the dynamic resource managing unit 905 and manages data according to time/MPU.

Figure 10:
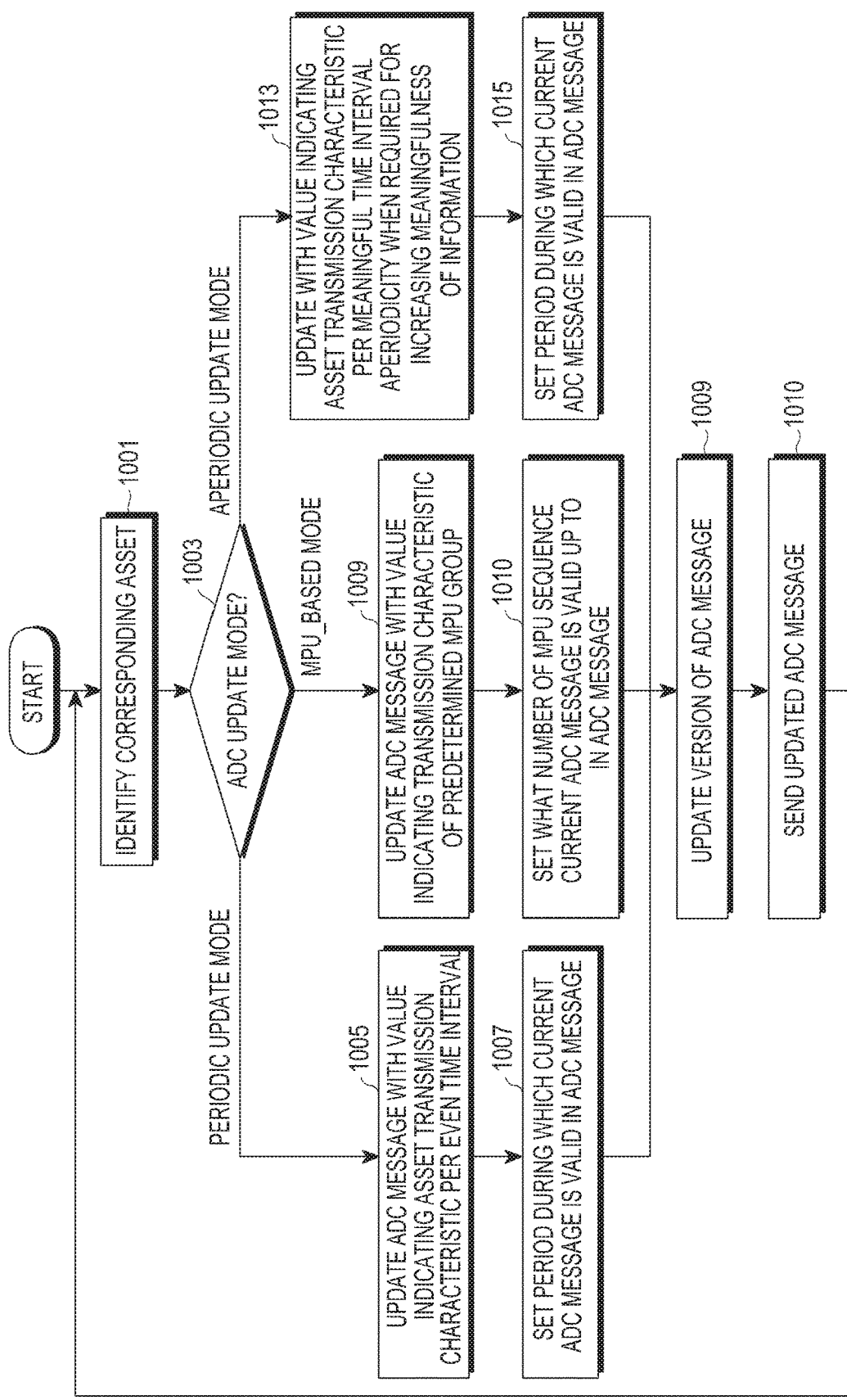
FIG. 10 is a view illustrating a method for allocating a resource in a sending entity of a communication system according to a first embodiment of the present invention.
Figure 11:
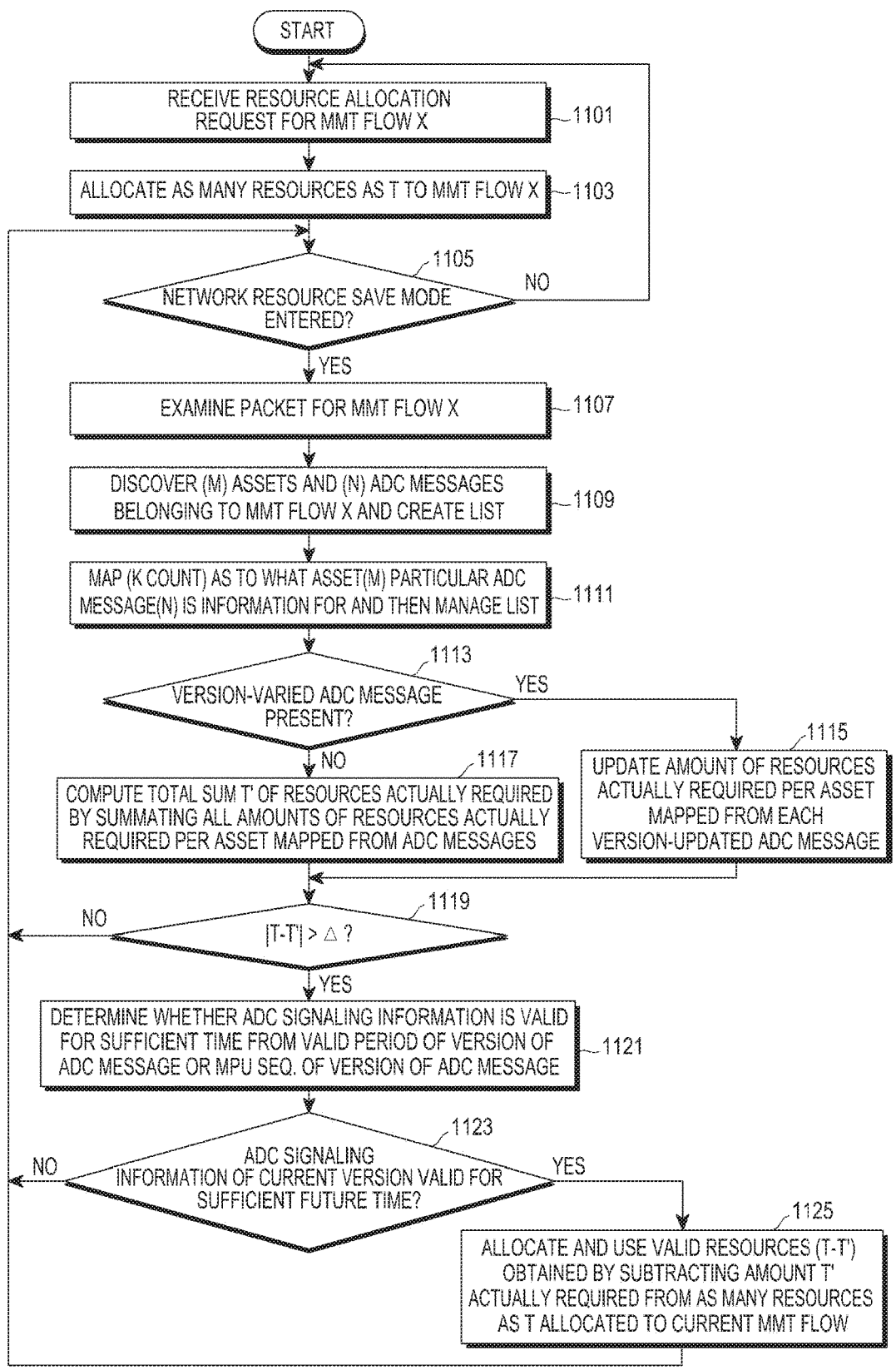
FIG. 11 is a view illustrating a method for allocating a resource in an intermediate node of a communication system according to the first embodiment of the present invention.
Figure 12:
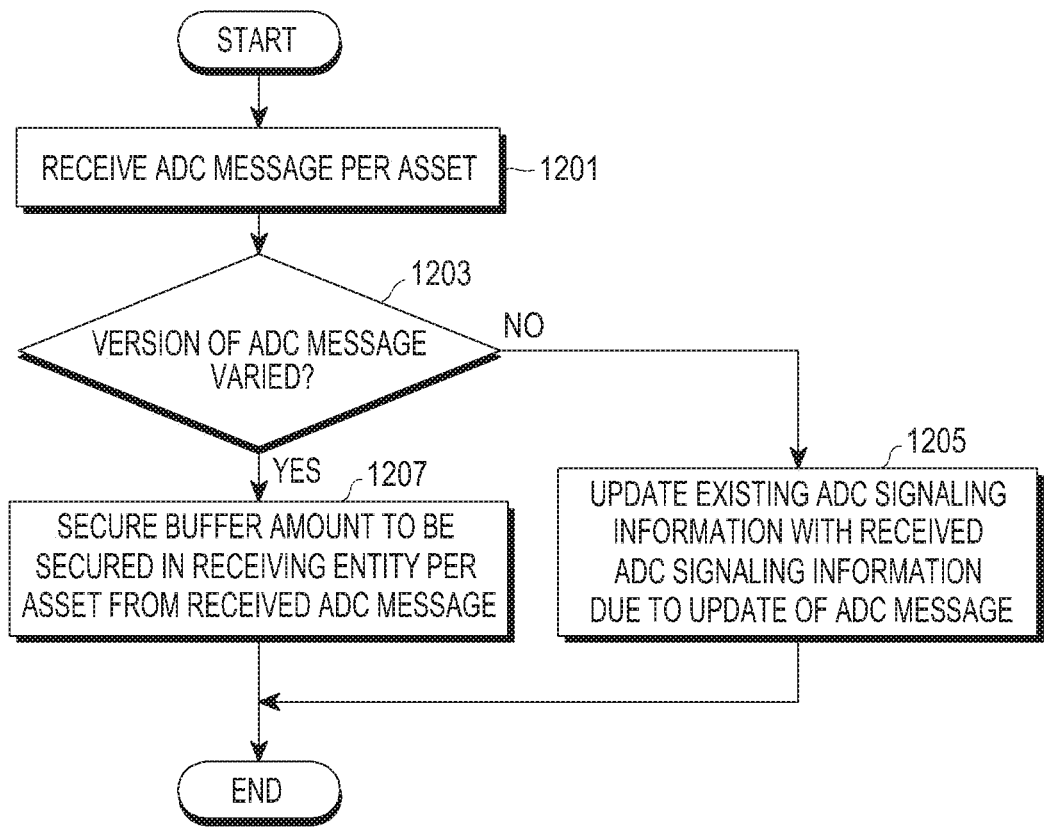
FIG. 12 is a view illustrating a method for allocating a resource in a receiving entity of a communication system according to the first embodiment of the present invention.

Now described are operations performed by a sending entity, intermediate node, and receiving entity in case one ADC message is transmitted per asset in a communication system according to a first embodiment of the present invention with reference to FIGS. 10 to 12.

FIG. 10 illustrates a method for allocating network resources by a sending entity in case one ADC message is sent per asset in a communication system according to the first embodiment of the present invention.

Referring to FIG. 10, the sending entity identifies a corresponding asset to be sent (1001). The sending entity determines whether the update mode of ADC message of the asset is a periodic update mode, MPU-based mode, or aperiodic update mode (1003).

The sending entity, in case the ADC update mode is the periodic update mode, updates the antenna module with a value indicating the asset transmission characteristic per even time interval (1005) and updates the valid period indicating how long the current ADC message remains valid in the ADC message (1007).

The sending entity, in case the ADC update mode is the MPC-based mode, updates the ADC message with a value indicating the transmission characteristic of a predetermined MPU group (1009) and updates what number of MPU sequence the current ADC message remains valid to in the ADC message (1011). The sending entity, in case the ADC update mode is the aperiodic update mode, updates the ADC message with a value indicating the asset transmission characteristic per meaningful time interval (aperiodic) when required for increasing the meaningfulness of the ADC signaling information (1013) and updates the valid period indicating how long the current ADC message remains valid in the ADC message (1015).

The sending entity updates the version information on the ADC message (1017) and sends the updated ADC message to the intermediate node (1019).

FIG. 11 illustrates a method for allocating network resources by an intermediate node in case one ADC message is sent per asset in a communication system according to the first embodiment of the present invention.

Referring to FIG. 11, the intermediate node receives a resource allocation request for a particular MMT flow (1101) and allocates as many resources as T to the MMT flow (1103).

The intermediate node determines whether to apply a network resource save mode (1105), and in case the network resource save mode applies, the intermediate node performs packet examination on the MMT flow (1107). The intermediate node discovers (M) assets and (N) ADC messages belonging to the MMT flow and creates a list (1109), performs mapping (K count) as to the asset(m) for which a particular ADC message(n) includes ADC signaling information and manages the list (1111).

The intermediate node determines whether there is version-varied ADC message in the its managing list (1113), and in case there is a version-varied ADC message, the intermediate node updates the amount of resources actually required per asset mapped from each version-varied ADC message (1115).

The intermediate node, unless there is version-varied ADC message, summates the amount of all resources actually required per asset mapped from ADC messages to compute the total sum T' of resources actually required (1117). The intermediate node determines whether the amount of idle resources is not less than a predetermined reference value (1119), and if so, determines whether ADC signaling information remains valid during a sufficient period from the valid period of the version of ADC message or MPU sequence of the version of ADC message (1121). The intermediate node determines whether the ADC signaling information of the current version remains valid during a sufficient period in the future (1123), and if valid, uses as many idle resources (T−T') as the amount obtained by subtracting the amount actually required from as many resources as T allocated to the MMT flow when allocating resources to other MMT flow (1125).

FIG. 12 illustrates a method for allocating resources by a receiving entity in case one ADC is sent per asset in a communication system according to the first embodiment of the present invention.

Referring to FIG. 12, the receiving entity receives an ADC message per asset (1201) and determines whether the version of ADC message is varied (1203). The receiving entity, in case the version of ADC message in the received per-asset ADC message is varied, secures an amount of buffer to be used by the receiving entity per asset from the ADC signaling information included in the received ADC message (1207). By contrast, unless the version of ADC message in the received per-asset ADC message is varied, since the ADC signaling information included in the ADC message has been updated (i.e., re-received), the existing ADC signaling information is updated with the received ADC signaling information (1205).

Figure 13:
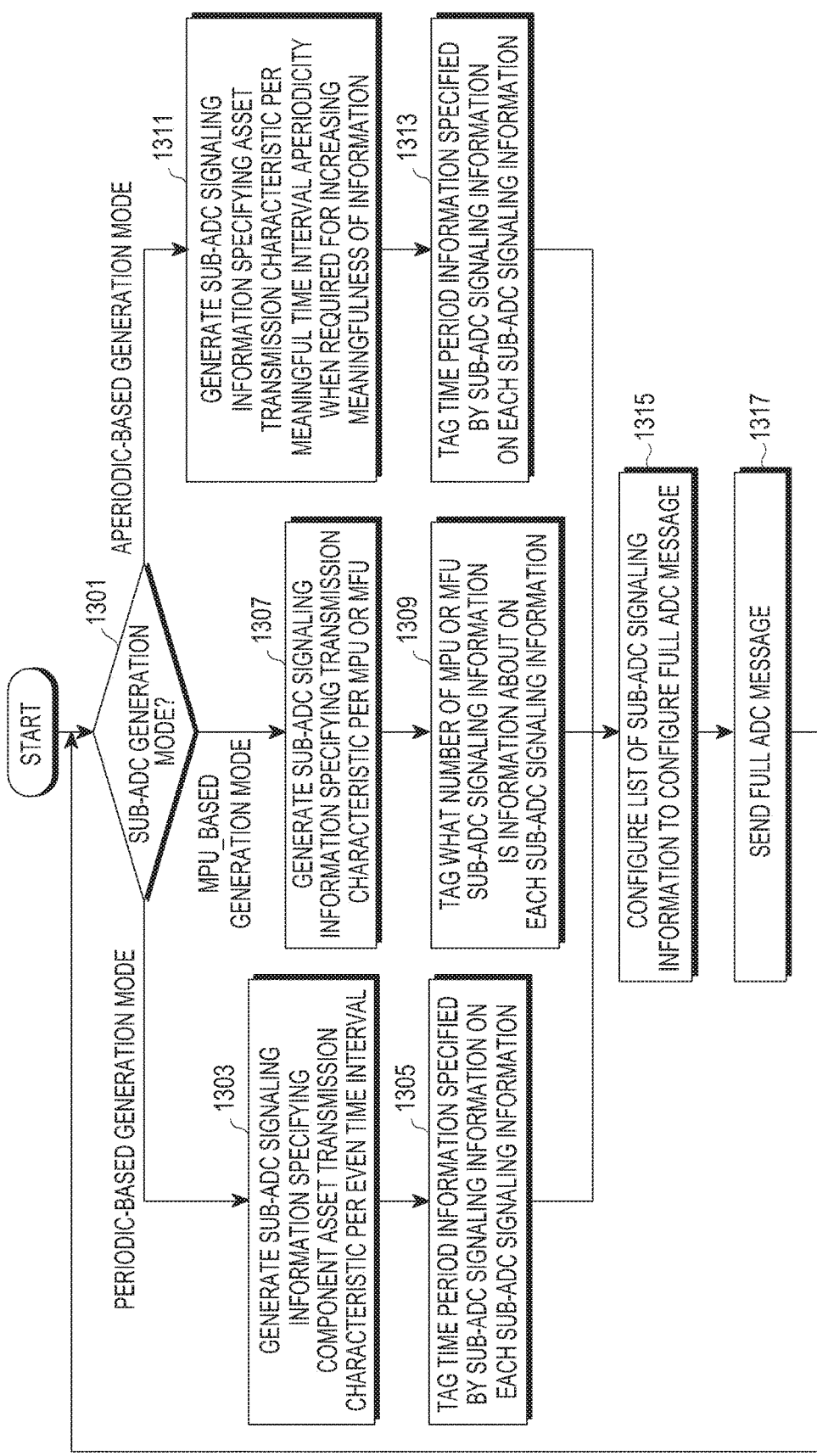
FIG. 13 is a view illustrating a method for allocating a resource in a sending entity of a communication system according to a second embodiment of the present invention.
Figure 14:
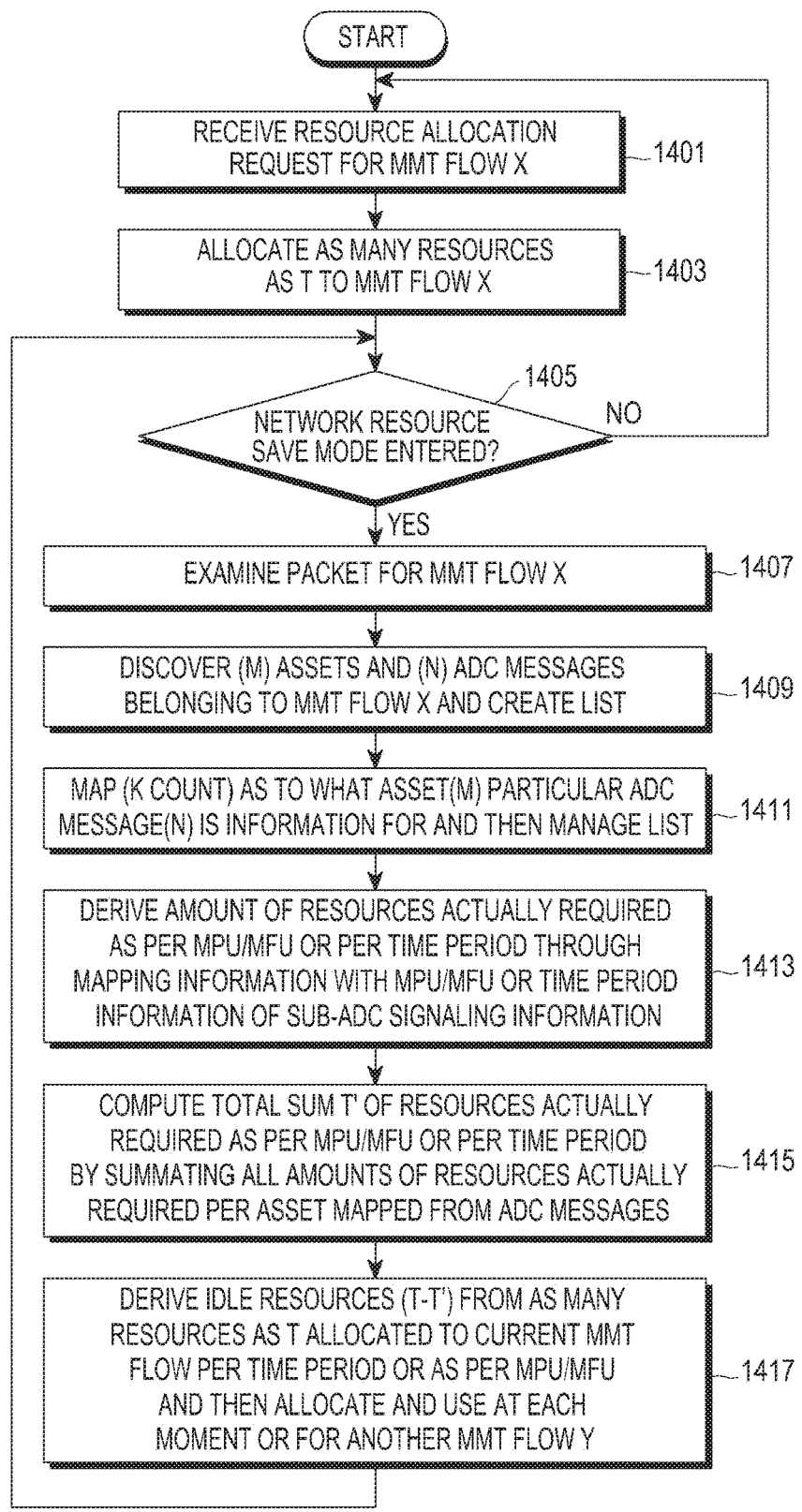
FIG. 14 is a view illustrating a method for allocating a resource in an intermediate node of a communication system according to the second embodiment of the present invention.
Figure 15:
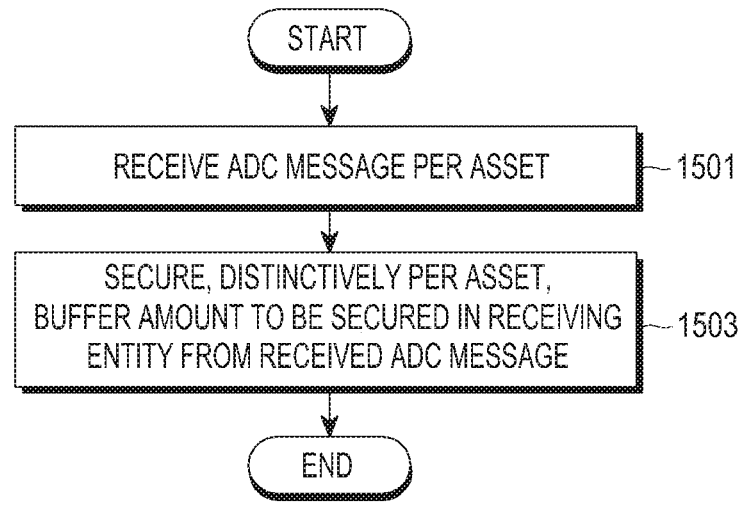
FIG. 15 is a view illustrating a method for allocating a resource in a receiving entity of a communication system according to the second embodiment of the present invention.

Now described are operations performed by a sending entity, intermediate node, and receiving entity in case ADC message is transmitted in a sub-ADC form in a communication system according to a second embodiment of the present invention with reference to FIGS. 13 to 15.

FIG. 13 illustrates a method for allocating resources by a sending entity in case ADC message is sent in a sub-ADC form in a communication system according to the second embodiment of the present invention.

Referring to FIG. 13, the sending entity determines a sub-ADC generation mode (1301).

The sending entity, in case the mode is determined to be a periodic-based sub-ADC generation mode, generates sub-ADC signaling information specifying the component asset transmission characteristic per even time interval (1303) and tags time period information specified by sub-ADC signaling information for each sub-ADC signaling information (1305).

In case the mode is MPU-based sub-ADC mode, the sending entity generates sub-ADC signaling information specifying transmission characteristic per MPU or MFU (1307) and tags on every sub-ADC significance as to what number of MPU or MFU the sub-ADC signaling information is about (1309).

The sending entity, in case the mode is aperiodic-based sub-ADC mode, generates sub-ADC signaling information specifying asset transmission characteristic per meaningful time interval aperiodicity when required for increasing meaningfulness of information (1311) and tags time period information specified by sub-ADC signaling information on each sub-ADC signaling information (1313).

The sending entity configures a sub-ADC signaling information list to configure a full ADC message (1315) and sends the configured full ADC message to the receiving entity (1317).

FIG. 14 illustrates a method for allocating resources by an intermediate node in case ADC message is sent in a sub-ADC form in a communication system according to the second embodiment of the present invention.

Referring to FIG. 14, the intermediate node receives a resource allocation request for a particular MMT flow (1401) and allocates as many resources as T to the MMT flow (1403).

The intermediate node determines whether to apply a network resource save mode (1405), and in case the network resource save mode applies, the intermediate node performs packet examination on the MMT flow (1407). The intermediate node discovers (M) assets and (N) ADC messages belonging to the MMT flow and creates a list (1409), performs mapping (K count) as to the asset(m) for which a particular ADC message(n) includes ADC signaling information and manages the list (1411).

The intermediate node derives the amount of actual resources required as per MPU/MFU or per time period through mapping information with MPU/MFU or time period information on sub-ADC signaling information (1411). The intermediate node computes the total sum T' for the amount of resources actually required according to MPU/MFU or per time period by summating the actual resource amount required per asset mapped from the ADC messages.

The intermediate node derives valid resources (T-T') from among as many resources as T allocated to the MMT flow according to MPU/MFU or per time period and then uses the same for allocating resources to another MMT flow or at each moment (1417).

FIG. 15 illustrates a method for allocating resources by a receiving entity in case ADC message is sent in a sub-ADC form in a communication system according to the second embodiment of the present invention.

Referring to FIG. 15, the receiving entity receives ADC message per asset (1501) and distinctively secure per asset the amount of buffer to be secured by the receiving entity from the sub-ADC signaling information contained in the received ADC message (1503).

As set forth above, according to an embodiment of the present invention, in case only one ADC message is allowed per asset during the course of updating ADC signaling information containing a parameter value indicating the transmission characteristic of media to be sent before sending to the intermediate node and receiving entity, the sending entity extracts the transmission characteristic value as per MPU unit that is the unit of configuration of the asset or transmission characteristic according to time of asset in a way of analyzing one by one the asset itself or using collected ADC signaling information. The sending entity, in case of desiring more accurate ADC signaling information transfer despite a difficulty in extracting ADC signaling information, computes the parameter value (i.e., a representative characteristic value) indicating the transmission characteristic at variable time unit intervals highly representative for ADC signaling information, includes the same in ADC signaling information, and sends a newly updated version of ADC message. Further, the sending entity, in case easy extraction of ADC signaling information is more required rather than meaningfulness of ADC signaling information, computes the parameter value indicating the transmission characteristic at constant fixed time unit intervals for ADC signaling information, includes the same in the ADC signaling information, and sends a newly updated version of ADC message. Further, the sending entity, in case of desiring more accurate ADC signaling information transfer despite a difficulty in extracting ADC signaling information, computes the parameter value indicating the transmission characteristic at variable MPU unit intervals highly representative for ADC signaling information, includes the same in ADC signaling information, and sends a newly updated version of ADC message. Further, the sending entity, in case easy extraction of ADC signaling information is more required rather than meaningfulness of ADC signaling information, computes a value indicating the transmission characteristic at constant fixed MPU unit intervals for ADC signaling information, includes the same in the ADC signaling information, and sends a newly updated version of ADC message.

Further, in case sub-ADC is allowed, the sending entity generates sub-ADC signaling information specifying component asset transmission characteristic per variable time unit interval, tags the time period information specified by the sub-ADC signaling information on each sub-ADC signaling information, configures the list in a full ADC message, and sends the same simultaneously. Or, the sending entity, rather than generating sub-ADC signaling information specifying component asset transmission characteristic per fixed time unit interval and tagging the time period information (period value) specified by the sub-ADC signaling information on each sub-ADC signaling, includes the same only one time, configures the sub-ADC list in one full ADC message, and sends the same simultaneously. Or, the sending entity generates sub-ADC signaling information specifying component asset transmission characteristic per variable MPU unit interval, tags the time period information specified by the sub-ADC signaling information on each sub-ADC signaling information, configures the list in a full ADC message, and sends the same simultaneously. Or, the sending entity, rather than generating sub-ADC signaling information specifying component asset transmission characteristic per per fixed MPU unit interval and tagging the MPU period information (period value) specified by the sub-ADC signaling information on each sub-ADC signaling information, includes the same only one time, configures the sub-ADC list in one full ADC message, and sends the same simultaneously.

According to an embodiment of the present invention, the intermediate node (e.g., a router or MANE), upon managing its possessing network resources, monitors MMT packets passing through the intermediate node, extracts an ADC message containing ADC signaling information therefrom, and in case only one ADC message is allowed per asset, determines whether the corresponding ADC signaling information is ADC signaling information newly updated to reflect the current traffic context through version information in the received ADC message. If the ADC message has been updated, the intermediate node updates the new ADC signaling information with a new value indicating the transmission characteristic of the asset, computes the total amount T' of resources actually required at a network level necessary per asset based on ADC signaling information which is media information, computes the amount |T−T'| of extra resources that have been allocated to the MMT flow but are not actually used using ADC signaling information, which is media information, and in case the amount of extra resources exceeds a predetermined level (threshold), determines that allocation of them to other traffic does not overburden and includes them as a target resource allocation candidate for other flow. Further, the intermediate node determines how further the ADC signaling information remains valid using time information on the valid period having a periodic or aperiodic value in the ADC message and reflects this value in making a final decision as to whether to allocate the extra resources to other traffic by a particular time point. Further, the intermediate node determines how further the ADC signaling information remains valid using information on a particular MPU sequence range or information on the number of MPUs having a periodic or aperiodic value in the ADC, reflects the value in making a final decision as to whether to allocate the extra resources to other traffic until a particular MPU arrives, and if the use of resources is finally determined, grasps the use status of extra network resources by the intermediate node, and allocates available network resources to other flow.

In case sub-ADC is allowed per asset, the intermediate node determines what ADC signaling information is included in the ADC signaling information per time period for valid period having a periodic or aperiodic value using the time information on the valid period having the periodic or aperiodic value in the ADC message. The intermediate node reflects the ADC signaling information in finally determining whether to allocate the extra resources to other traffic by a particular time point to thereby derive the amount of resources actually required. Or, the intermediate node determines what ADC signaling information is included in the ADC signaling information per particular MPU sequence range period or information on the number of MPUs having a periodic or aperiodic value using information on the particular sequence range or information on the number of MPUs having the periodic or aperiodic value in the ADC message. The intermediate node reflects the signaling information in finally determining whether to allocate the extra resources to other traffic by a particular time point to thereby derive the amount of resources actually required. The intermediate node computes the total sum amount T' of resources actually required as per MPU or per time period by summating the amount of resources actually required per asset mapped from the ADC messages, derives idle resources (T−T') from among as many resources as T allocated to the current MMT flow per time period or per MPU period, then grasps the use status of network resources in the intermediate node, analyzes the characteristic of media traffic passing through the intermediate node, and allocates available network resources to other traffic.

Further, according to an embodiment of the present invention, the receiving entity, during the course of receiving media (e.g., audio or video), determines the amount of buffer to be secured by the MMT receiving unit per asset unit in the MMT flow, but not the overall MMT flow, using ADC signaling information including a value indicating the media transmission characteristic and updates and adjusts the amount of buffer required to be secured per asset according to time /MPU.

Figure 16:
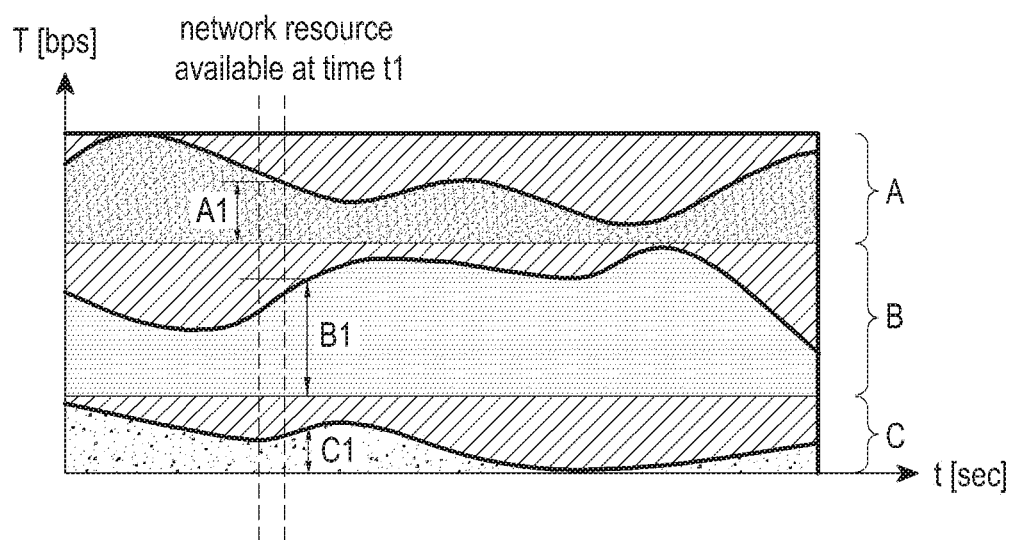
FIG. 16 is a view illustrating a resource saving effect when a sub-ADC is used according to the second embodiment of the present invention.

FIG. 16 is a view illustrating a resource saving effect when a sub-ADC is used according to an embodiment of the present invention.

According to an embodiment of the present invention, a variation characteristic of media traffic is delivered using an ACD message so as to be known in advance to network intermediate nodes, allowing for efficient resource operation. Thus, waste of network resources may be reduced in an environment where a single piece of traffic, such as UHD content, consumes a large amount of network resources.

Although specific embodiments of the present invention have been described above, various changes may be made thereto without departing from the scope of the present invention. Thus, the scope of the present invention should not be limited to the above-described embodiments, and should rather be defined by the following claims and equivalents thereof.

The invention claimed is:

1. A method for allocating a network resource in a sending entity in a communication system, the method comprising:
    generating an asset delivery characteristics (ADC) message including parameter values indicating a transmission characteristic of one asset;
    transmitting the generated ADC message; and
    updating the parameter values included in the generated ADC message and transmitting updated ADC message at predetermined intervals;
    wherein each transmitted ADC message comprises a version value and a valid period for that transmitted ADC message,
    wherein an amount of network resources and an amount of a buffer required for the one asset during each valid period are set based on the respective version value and the respective parameter values, and
    wherein an amount of available network resources, obtained by subtracting the amount of network resources required for the one asset from an amount of previously reserved network resources for the one asset, is allocated to other traffic.

2. The method of claim 1, wherein the transmitting of the ADC messages comprises transmitting the ADC messages to an intermediate node.

3. The method of claim 1, wherein the parameter values include at least one of a sustainable transmission rate (sustainable_rate), a buffer size (buffer_size), a maximum transmission rate (peak_rate), a maximum MFU (Media Fragment Unit) size (max_MFU_size), and one MFU period (MFU_period).

4. A method for allocating a network resource in an intermediate node of a communication system, the method comprising:

receiving a first asset delivery characteristics (ADC) message including parameter values indicating a transmission characteristic on one asset, wherein the first ADC message comprises a first version value and a valid period for the first ADC message;

in a case where the first version value included in the first ADC message is different from a second version value included in a second ADC message previously received, identifying an amount of network resources required for the one asset based on the first ADC message during the valid period, wherein the second ADC message is an ADC message received for the one asset immediately prior to receiving the first ADC message;

identifying an amount of available network resources, obtained by subtracting the amount of network resources required for the one asset from an amount of previously reserved network resources for the one asset; and allocating the identified amount of available network resources to other traffic.

5. The method of claim 4, wherein the parameter values includes at least one of a sustainable transmission rate (sustainable_rate), a buffer size (buffer_size), a maximum transmission rate (peak_rate), a maximum MFU (Media Fragment Unit) size (max_MFU_size), and one MFU period (MFU_period).

6. The method of claim 4, further comprising transmitting the first ADC message to a receiving entity.

7. A method for allocating a network resource in a receiving entity in a communication system, the method comprising:

receiving an asset delivery characteristics (ADC) message including parameter values indicating a transmission characteristic of one asset; and identifying an amount of a buffer required for the asset based on the received ADC message, wherein one or more ADC messages for the one asset are received at predetermined intervals, wherein each ADC message comprises a version value and a valid period for the ADC message, each ADC message comprising updated parameter values, wherein an amount of network resources required for the one asset during the valid period are set based on the version value and the parameter values, and wherein an amount of available network resources, obtained by subtracting the amount of network resources required for the one asset from an amount of previously reserved network resources for the one asset, is allocated to other traffic.

8. The method of claim 7, wherein the parameter values include at least one of a sustainable transmission rate (sustainable_rate), a bufer . . . buffer size (buffer_size), a maximum transmission rate (peak_rate), a maximum MFU (Media Fragment Unit) size (max_NIFU_size), and one MFU period (MFU_period).

9. An apparatus for allocating a network resource in a sending entity in a communication system, the apparatus comprising:

a transceiver; and at least one processor configured to:

generate an asset delivery characteristics (ADC) message including parameter values indicating a transmission characteristic of one asset, control the transceiver to transmit the generated ADC message, and update the parameter values included in the generated ADC message and control the transceiver to transmit updated ADC message at predetermined intervals;

wherein each transmitted ADC message comprises a version value and a valid period for that transmitted ADC message, wherein an amount of network resources and an amount of a buffer required for the one asset during each valid period are set based on the respective version value and the respective parameter values, and wherein an amount of available network resources, obtained by subtracting the amount of network resources required for the one asset from an amount of previously reserved network resources for the one asset, is allocated to other traffic.

10. The apparatus of claim 9, wherein the processor is further configured to control the transceiver to transmit the ADC messages to an intermediate node.

11. The apparatus of claim 9, wherein the parameter values include at least one of a sustainable transmission rate (sustainable_rate), a buffer size (buffer_size), a maximum transmission rate (peak_rate), a maximum MFU (Media Fragment Unit) size (max_MFU_size), and one MFU period (MFU_period).

12. An apparatus for allocating a network resource in an intermediate node of a communication system, the apparatus comprising:

a transceiver configured to receive an asset delivery characteristics (ADC) message including parameter values indicating a transmission characteristic on one asset, wherein the first ADC message comprises a first version value and a valid period for the first ADC message; and at least one processor configured to:

in a case where the first version value included in the first ADC message is different from a second version value included in a second ADC message:

identify an amount of network resources required for the one asset based on the first ADC message during the valid period, wherein the second ADC message is an ADC message received for the one asset immediately prior to receiving the first ADC message, identify an amount of available network resources, obtained by subtracting the amount of network resources required for the one asset from an amount of previously reserved network resources for the one asset, and allocate the identified amount of available network resources to other traffic.

13. The apparatus of claim 12, wherein the parameter values include at least one of a sustainable transmission rate (sustainable_rate), a buffer size (buffer_size), a maximum transmission rate (peak_rate), a maximum MFU (Media Fragment Unit) size (max_MFU_size), and one MFU period (MFU_period).

14. An apparatus for allocating a network resource in a receiving entity in a communication system, the apparatus comprising:

a transceiver configured to receive at least one asset delivery characteristics (ADC) message including parameter values indicating a transmission characteristic of one asset; and at least one processor configured to identify an amount of a buffer required for the one asset based on the received ADC message, wherein one or more ADC messages for the one asset are received at predetermined intervals, wherein each ADC message comprises a version value and a valid period for the ADC message, each ADC message comprising updated parameter values, wherein an amount of network resources required for the one asset during the valid period are set based on the version value and the parameter values, and wherein an amount of available network resources, obtained by subtracting the amount of network resources required for the one asset from an amount of previously reserved network resources for the one asset, is allocated to other traffic.

15. The method of claim 14, wherein the parameter values include at least one of a sustainable transmission rate (sustainable_rate), a buffer size (buffer_size), a maximum transmission rate (peak_rate), a maximum MFU (Media Fragment Unit) size (max_MFU_size), and one MFU period (MFU_period).

* * * * *